(12) United States Patent
Ishihara et al.

(10) Patent No.: US 10,435,863 B2
(45) Date of Patent: Oct. 8, 2019

(54) CONTROL SYSTEM FOR CONSTRUCTION MACHINE

(71) Applicant: HITACHI CONSTRUCTION MACHINERY CO., LTD., Tokyo (JP)

(72) Inventors: Shinji Ishihara, Ushiku (JP); Masafumi Hita, Tsuchiura (JP); Shinya Imura, Toride (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/555,705

(22) PCT Filed: Mar. 11, 2016

(86) PCT No.: PCT/JP2016/057876
§ 371 (c)(1),
(2) Date: Sep. 14, 2017

(87) PCT Pub. No.: WO2017/154219
PCT Pub. Date: Sep. 14, 2017

(65) Prior Publication Data
US 2018/0238018 A1    Aug. 23, 2018

(51) Int. Cl.
*E02F 3/43* (2006.01)
*E02F 9/20* (2006.01)
*E02F 9/22* (2006.01)
*F15B 11/16* (2006.01)
*E02F 9/12* (2006.01)
(Continued)

(52) U.S. Cl.
CPC .............. *E02F 3/435* (2013.01); *E02F 3/437* (2013.01); *E02F 9/123* (2013.01); *E02F 9/2037* (2013.01);
(Continued)

(58) Field of Classification Search
USPC ........................................................ 701/22
See application file for complete search history.

(56) References Cited

U.S. PATENT DOCUMENTS 6,374,147 B1 * 4/2002 Rockwood ............ B66F 9/0655
414/699
2009/0301075 A1 * 12/2009 Morinaga ................. B66C 1/42
60/459
(Continued)

FOREIGN PATENT DOCUMENTS

JP    62-284836 A    12/1987
JP    63-093936 A    4/1988
(Continued)

OTHER PUBLICATIONS

International Search Report of PCT/JP2016/057876 dated May 17, 2016.
(Continued)

*Primary Examiner* — Fadey S. Jabr
*Assistant Examiner* — Mahmoud M Kazimi
(74) *Attorney, Agent, or Firm* — Mattingly & Malur, PC

(57) ABSTRACT

A control system for a construction machine maintains operability of a swing combined operation even when the power supplied from an engine or storage device varies. The control system includes a target path computation section that receives an operation amount of the front implement operation device, an operation amount of the swing operation device, a speed of the front implement drive unit detected, and an angular speed of the swing structure drive unit, and that computes a target path of a claw tip position of the front implement drive unit; and an actuator power computation section that regulates power supplied to the front implement drive unit or the swing structure drive unit in such a manner that a claw tip of the front implement drive unit follows the target path the front implement operation device and the swing operation device are operated simultaneously.

4 Claims, 14 Drawing Sheets

(51) Int. Cl.
 *E02F 3/32* (2006.01)
(52) U.S. Cl.
 CPC .......... *E02F 9/2075* (2013.01); *E02F 9/2095*
 (2013.01); *E02F 9/22* (2013.01); *E02F 9/2246*
 (2013.01); *F15B 11/16* (2013.01); *B60Y*
 *2200/412* (2013.01); *E02F 3/32* (2013.01);
 *E02F 9/2292* (2013.01); *E02F 9/2296*
 (2013.01); *F15B 2211/20523* (2013.01); *F15B*
 *2211/6336* (2013.01); *F15B 2211/6655*
 (2013.01); *F15B 2211/7051* (2013.01); *F15B*
 *2211/7058* (2013.01); *Y10S 903/903* (2013.01)

(56) References Cited

U.S. PATENT DOCUMENTS

2014/0371995 A1* 12/2014 Udagawa ................ E02F 9/123
 701/50

2017/0255895 A1* 9/2017 Kozumi .................. E02F 3/435
2017/0275854 A1* 9/2017 Izumikawa ............. E02F 3/431

FOREIGN PATENT DOCUMENTS

| JP | 2007-217992 A | 8/2007 |
| JP | 2010-189864 A | 9/2010 |
| JP | 5074432 B2 | 11/2012 |
| KR | 10-2014-0117364 A | 10/2014 |
| KR | 10-2015-0013903 A | 2/2015 |

OTHER PUBLICATIONS

International Preliminary Report on Patentability received in corresponding International Application No. PCT/JP2016/057876 dated Sep. 20, 2018.
Korean Office Action received in corresponding Korean Application No. 10-2017-7022354 dated Oct. 22, 2018.

* cited by examiner

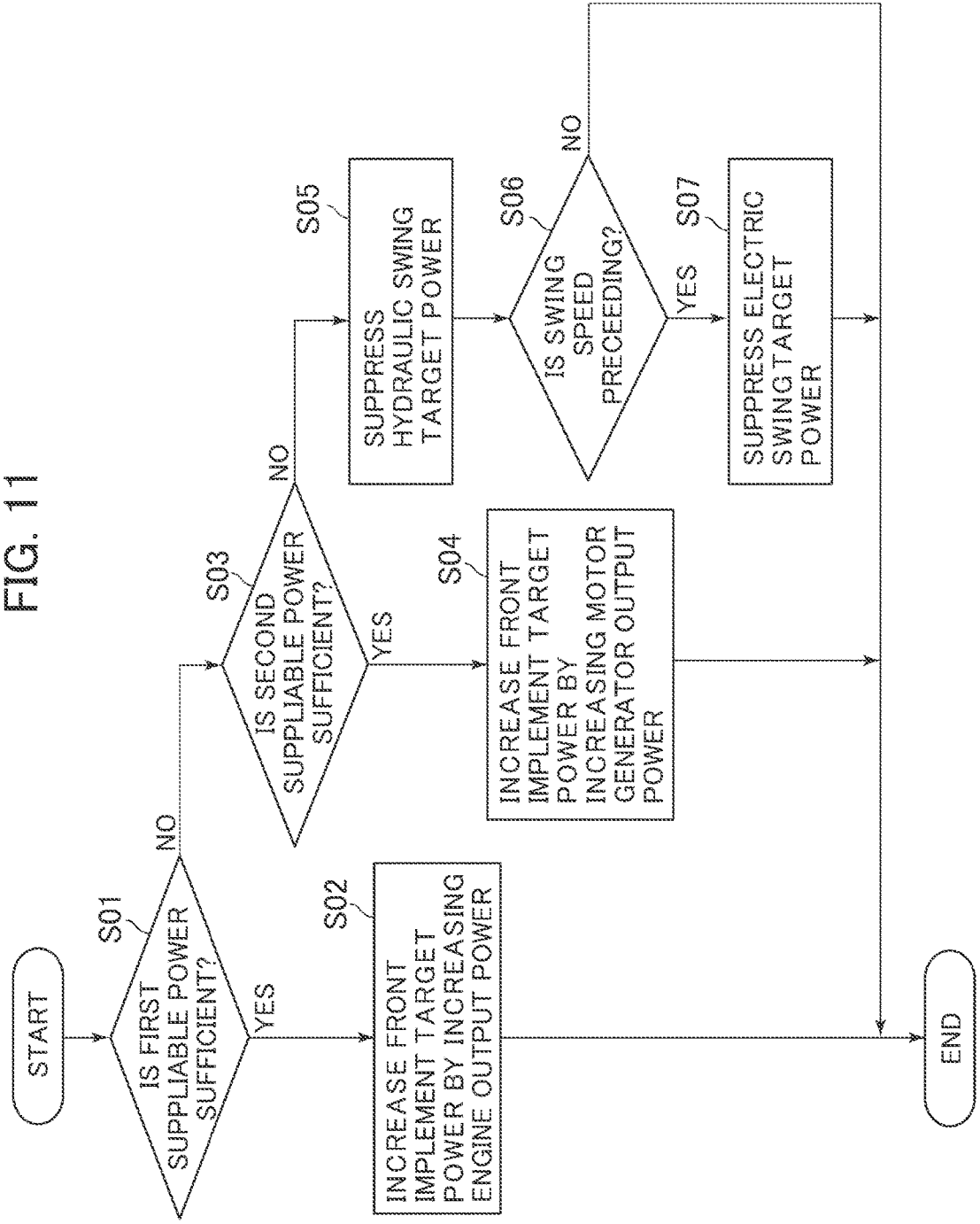

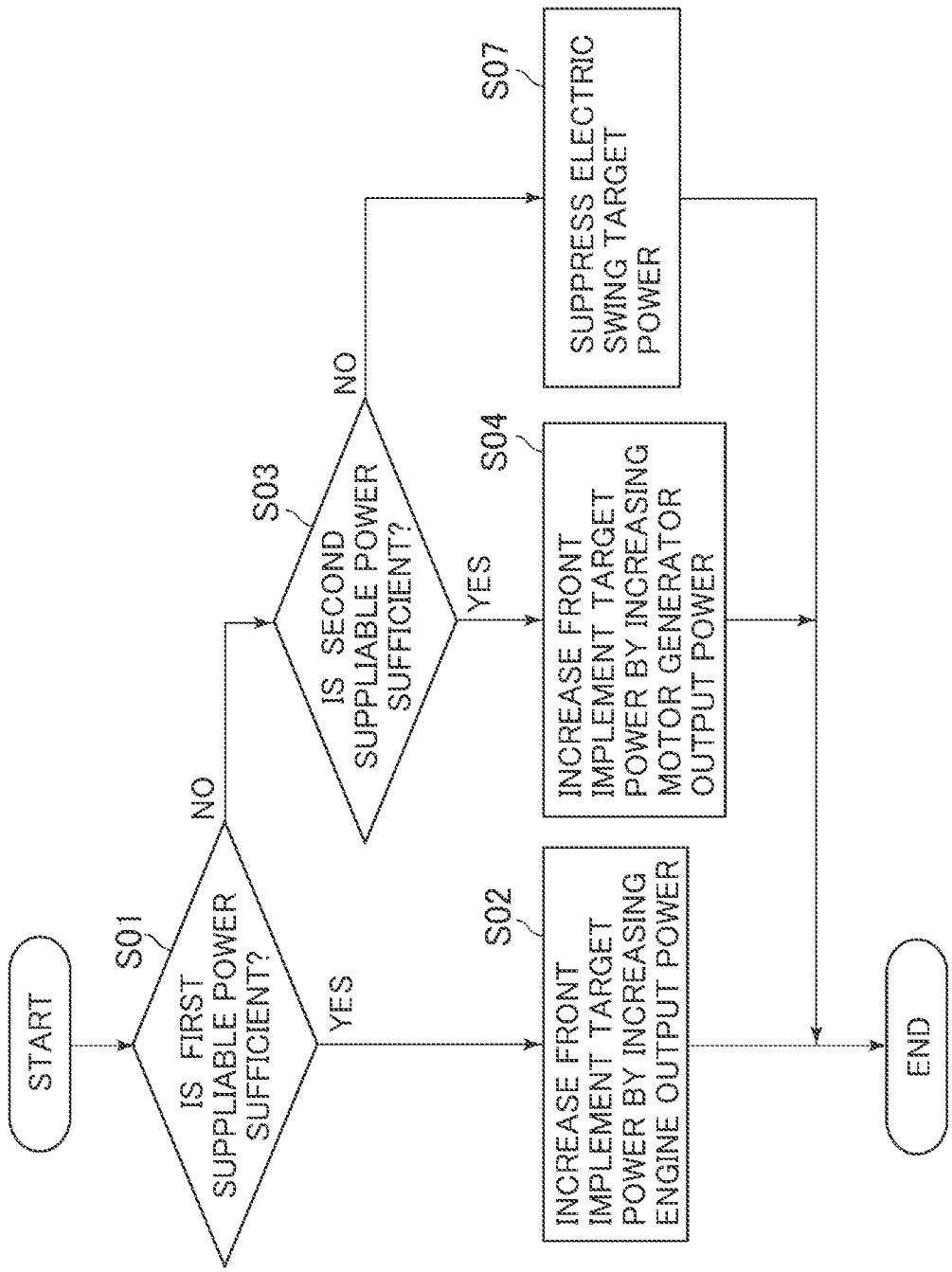

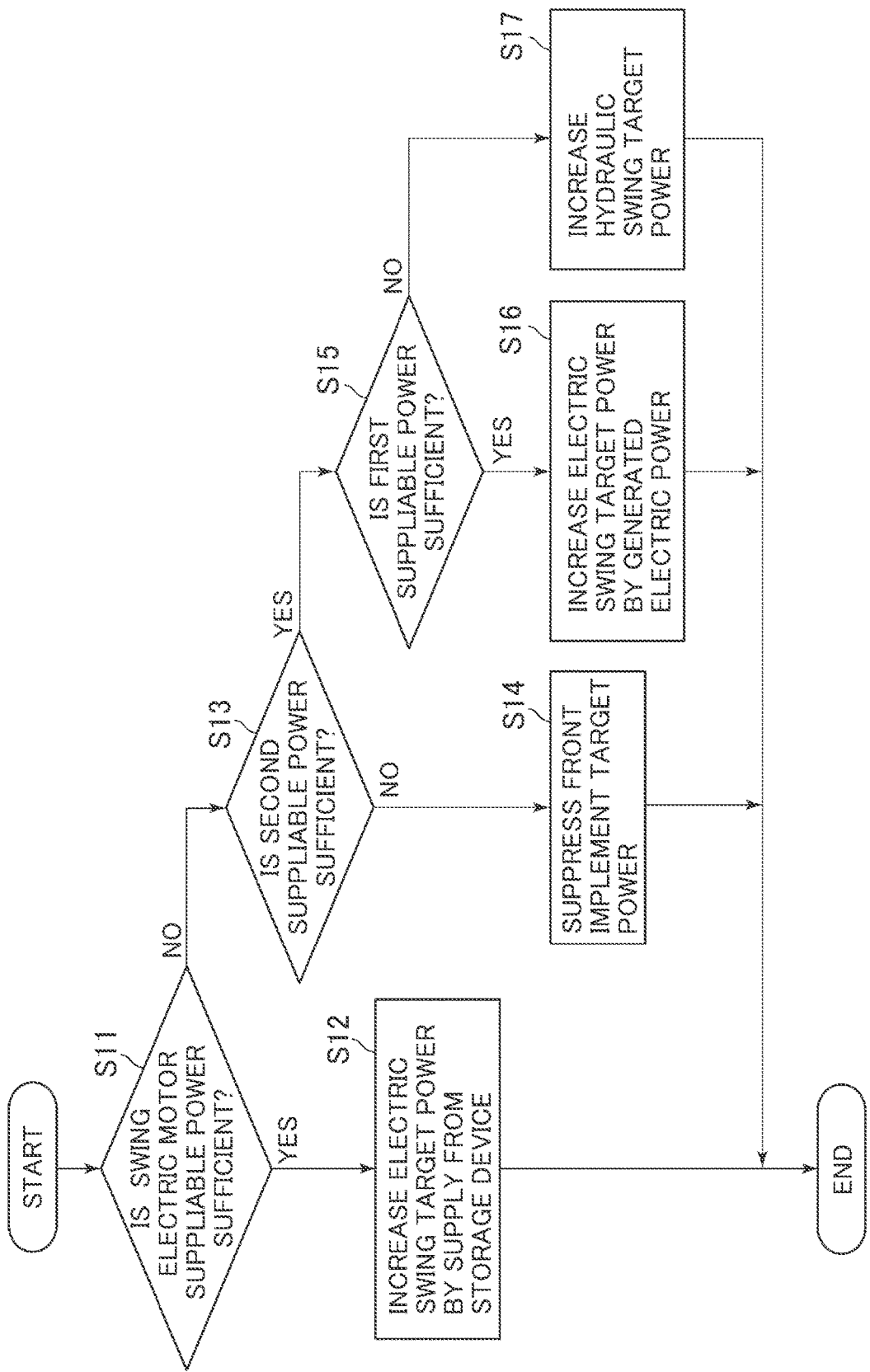

CONTROL SYSTEM FOR CONSTRUCTION MACHINE

TECHNICAL FIELD

The present invention relates to a control system for a construction machine.

BACKGROUND ART

A hydraulic excavator as a construction machine performs a "swing boom raising" operation that is a combined operation of raising a boom while swinging the boom in order to discharge excavated earth, sand, and the like onto a cargo of a dump truck. It is a well-known technique to reduce a swing speed at this time from that at a time of a sole swing operation or to increase a boom raising speed from that at the time of the sole swing operation, with a view to avoiding the contact of a bucket with the dump truck or with an excavation slope.

In recent years, the development of a hybrid excavator including an electric swing motor that is an alternative to a conventional hydraulic swing motor or that assists the hydraulic swing motor in functioning is underway for reducing fuel cost. Even the hybrid excavator of this type needs to maintain operability for the swing boom raising operation similarly to the conventional hydraulic excavator.

There is disclosed a method for maintaining the operability for the swing boom raising operation by determining, by the hybrid excavator including the electric swing motor as an alternative to the hydraulic swing motor and including "operation detection units" detecting a boom operation and a swing operation, that the swing boom raising operation has been executed on the basis of a signal detected by this operation detection unit, and then suppressing output power of the electric swing motor, compared with output power at a time of the sole swing operation (refer to, for example, Patent Document 1).

PRIOR ART DOCUMENT

Patent Document

Patent Document 1: Japanese Patent No. 5074432

SUMMARY OF THE INVENTION

Problem to be Solved by the Invention

According to the aforementioned conventional technique, the hybrid excavator can maintain the operability for the swing boom raising operation in a normal state. However, since Patent Document 1 makes no mention of a case in which, for example, a remaining amount of a storage device is insufficient and there is a shortage of electric power supplied to the electric swing motor, it is difficult to maintain the operability in such a case. Furthermore, since Patent Document 1 makes no mention of regulating the allocation of output power of the hydraulic swing motor and output power of the electric swing motor, it is difficult to apply the technique to an actual machine as it is.

Moreover, in a situation such as an upland environment in which the output power of an engine falls, energy suppliable from a hydraulic pump of the hybrid excavator described above to a hydraulic actuator is accordingly limited. In such a situation, simply suppressing the swing speed, compared with that at normal time according to the aforementioned conventional technique possibly causes the swing speed to be relatively higher than the boom raising speed and the bucket to contact the dump truck.

The present invention has been achieved on the basis of the respects described above, and an object of the present invention is to provide a control system for a construction machine, capable of maintaining excellent operability for a swing-combined operation even if power suppliable from an engine or electric power suppliable from a storage device varies.

Means for Solving the Problems

To attain the object, a first invention is a control system for a construction machine, including: an engine; a hydraulic pump driven by the engine; a front implement drive unit driven by a hydraulic actuator; a swing structure drive unit driven by a swing motor; a front implement operation device for operating the front implement drive unit; and a swing operation device for operating the swing structure drive unit. The control system includes: a front implement speed detector that detects a speed of the front implement drive unit; a swing structure speed detector that detects an angular speed of the swing structure drive unit; a target path computation section that receives an operation amount of the front implement operation device, an operation amount of the swing operation device, the speed of the front implement drive unit detected by the front implement speed detector, and the angular speed of the swing structure drive unit detected by the swing structure speed detector, and that computes a target path of a claw tip position of the front implement drive unit; and an actuator power computation section that regulates power supplied to the front implement drive unit or the swing structure drive unit in such a manner that a claw tip of the front implement drive unit follows up the target path computed by the target path computation section when the front implement operation device and the swing operation device are operated simultaneously.

Advantages of the Invention

According to the present invention, it is easy to keep a trajectory of a front implement at a target position at a time of a combined operation and it is, therefore, possible to maintain excellent operability for a swing-combined operation even if power suppliable from an engine or electric power suppliable from a storage device varies.

BRIEF DESCRIPTION OF THE DRAWINGS

FIG. 11 is a flowchart diagram illustrating an example of contents of a process by the actuator power computation section that constitutes the embodiment of the control system for the construction machine according to the present invention.

FIG. 12 is an example of a flowchart diagram illustrating partial modification of the contents of the process by the actuator power computation section shown in FIG. 11 in response to a mode of the construction machine.

FIG. 14 is a flowchart diagram illustrating another example of the contents of the process by the actuator power computation section that constitutes the embodiment of the control system for the construction machine according to the present invention.

MODES FOR CARRYING OUT THE INVENTION

Figure 1:
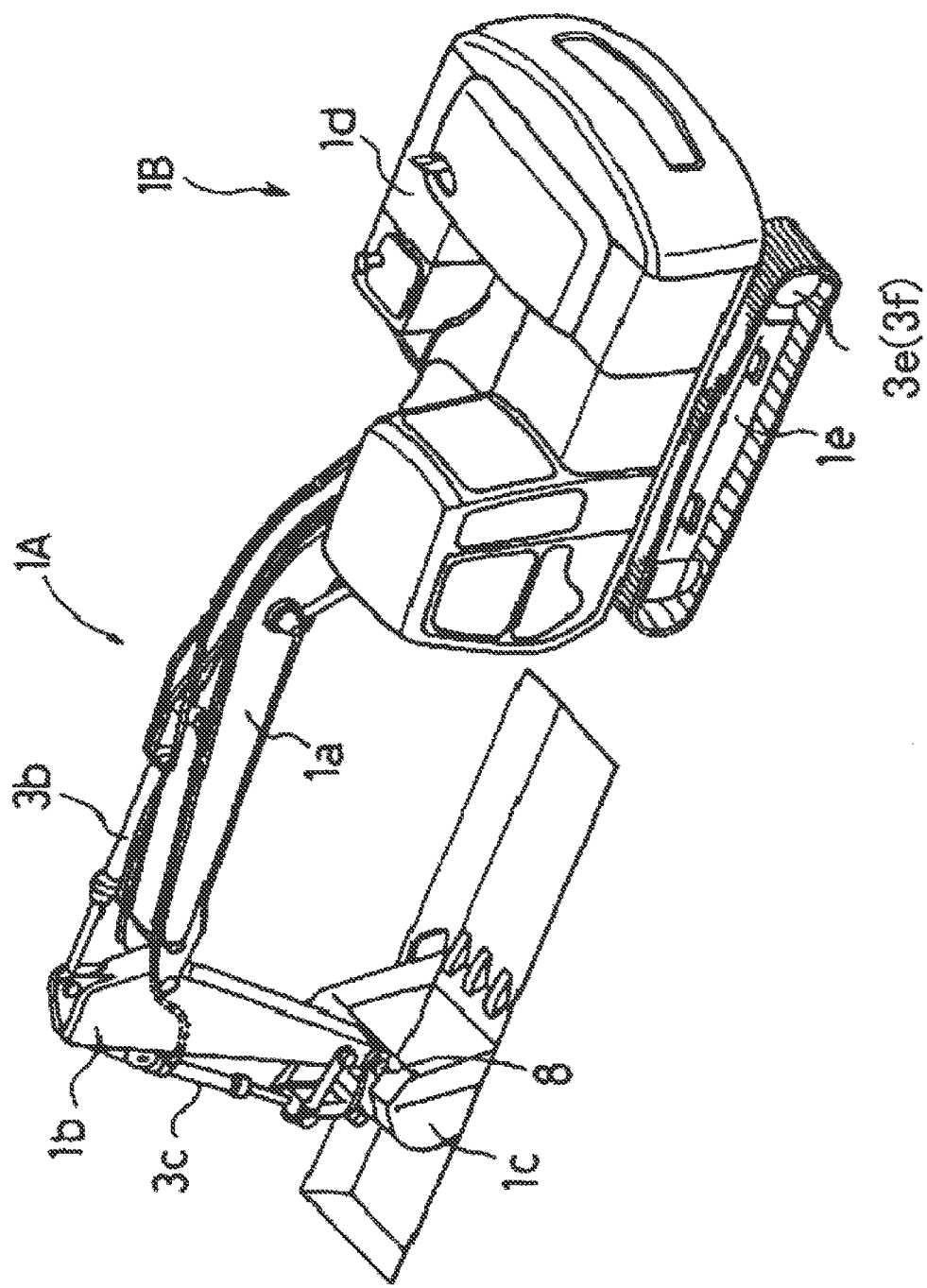
FIG. 1 is a perspective view illustrating a hybrid excavator including one embodiment of a control system for a construction machine according to the present invention.

Embodiments of a control system for a construction machine according to the present invention will be described hereinafter with reference to the drawings. The description will be given while referring to a hydraulic excavator as a work machine by way of example. FIG. 1 is a perspective view illustrating a hybrid excavator including one embodiment of a control system for a construction machine according to the present invention, FIG. 2 is a conceptual diagram of an actuator drive control system for the hybrid excavator including the embodiment of the control system for the construction machine according to the present invention, and FIG. 3 is a control block diagram illustrating a configuration of the embodiment of the control system for the construction machine according to the present invention.

In FIG. 1, the hybrid excavator includes a multijoint-type front implement 1A configured with a boom 1a, an arm 1b, and a bucket 1c which are perpendicularly and rotationally movable; and a machine body 1B configured with an upper swing structure 1d and a lower travel structure 1e. A base end of the boom 1a that constitutes the front implement 1A is supported by a front implement portion of the upper swing structure 1d in a perpendicularly and rotationally movable manner. The boom 1a, the arm 1b, the bucket 1c, the upper swing structure 1d, and the lower travel structure 1e are driven by a boom cylinder (hydraulic cylinder) 3a, an arm cylinder 3b, a bucket cylinder 3c, a hydraulic swing motor 16 (refer to FIG. 2) and an electric swing motor 10 (refer to FIG. 2), and left and right hydraulic travel motors 3e and 3f, respectively.

Operations of the boom 1a, the arm 1b, the bucket 1c, and the upper swing structure 1d are instructed by a hydraulic control signal (control pilot pressure) of an operation lever unit 4 (refer to FIG. 2), and an operation of the lower travel structure 1e is instructed by a hydraulic control signal (control pilot pressure) of a travelling pedal unit that is not shown.

Figure 2:
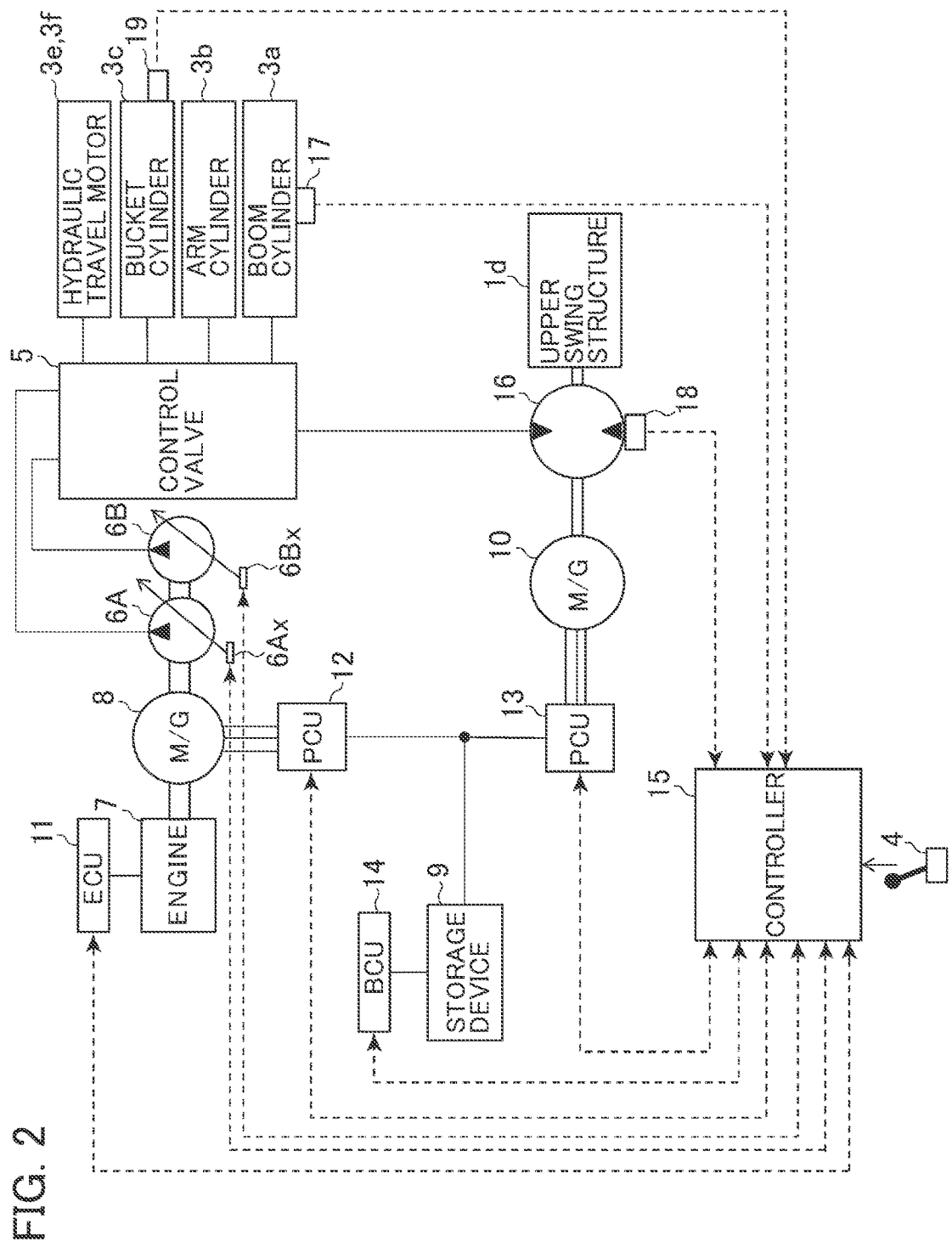
FIG. 2 is a conceptual diagram of an actuator drive control system for the hybrid excavator including the embodiment of the control system for the construction machine according to the present invention.
Figure 3:
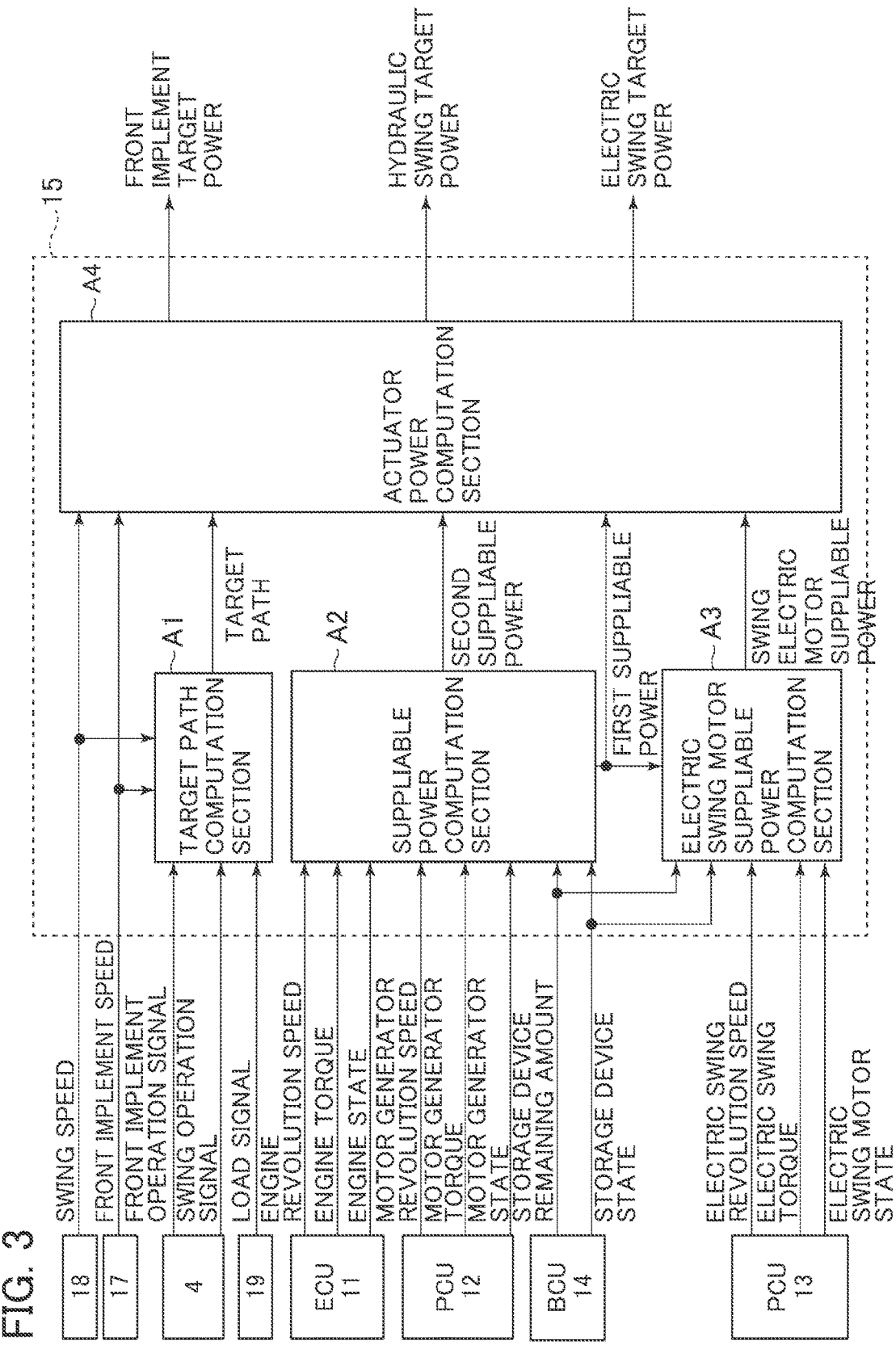
FIG. 3 is a control block diagram illustrating a configuration of the embodiment of the control system for the construction machine according to the present invention.

In FIG. 2, the actuator drive control system according to the present embodiment includes the operation lever unit 4 and the travelling control pedal unit that is not shown, both of which are operated by an operator, a first hydraulic pump 6A and a second hydraulic pump 6B, a control valve 5 that controls a direction and a flow rate of a hydraulic fluid delivered by the first hydraulic pump 6A to supply the hydraulic fluid to hydraulic actuators other than the hydraulic swing motor 16, and controls a direction and a flow rate of a hydraulic fluid delivered by the second hydraulic pump 6B to supply the hydraulic fluid to the hydraulic swing motor 16, an engine 7, a motor generator 8, and a storage device 9. The engine 7, the motor generator 8, and the first and second hydraulic pumps 6A and 6B are mechanically connected by a same rotary shaft. Likewise, the hydraulic swing motor 16 and the electric swing motor 10 are mechanically connected by a same rotary shaft, and the upper swing structure 1d is driven by a total torque of the hydraulic swing motor 16 and the electric swing motor 10.

The actuator drive control system also includes an engine control unit (ECU) 11 for controlling a revolution speed and a torque of the engine 7, an inverter (PCU) 12 for controlling a revolution speed and a torque of the motor generator 8, an inverter (PCU) 13 for controlling a revolution speed and a torque of the electric swing motor 10, a battery control unit (BCU) 14 for controlling charge and discharge of the storage device 9, and a controller 15 integrally controlling these units.

The control valve 5 is driven via a path that is not shown in response to operator's operations on the operation lever unit 4 and the control pedal unit that is not shown, to open or close a hydraulic path corresponding to each operation, thereby controlling flows (directions and flow rates) of the hydraulic fluids delivered by the first and second hydraulic pumps 6A and 6B and controlling the hydraulic actuators (the boom cylinder 3a, the arm cylinder 3b, the bucket cylinder 3c, the hydraulic travel motors 3e and 3f, and the hydraulic swing motor 16).

The first hydraulic pump 6A is used for driving the actuators that constitute the front implement 1A, while the second hydraulic pump 6B is used for driving the hydraulic swing motor 16.

The first and second hydraulic pumps 6A and 6B are driven to rotate by the engine 7 and/or the motor generator 8. The first and second hydraulic pumps 6A and 6B are variable displacement pumps and include regulators 6Ax and 6Bx, respectively. As well known, the regulators 6Ax and 6Bx increase swash plate tilting angles (capacities) of the first and second hydraulic pumps 6A and 6B as operation amounts (demanded flow rates) of a control lever and a pedal that are operation members of the operation lever unit 4 and the operation pedal unit increase and the hydraulic operation signals rise. The regulators 6Ax and 6Bx thereby increase the delivery flow rates of the first and second hydraulic pumps 6A and 6B. Furthermore, the regulators 6Ax and 6Bx each include a torque limiting control function to exercise control such that the tilting angle (capacity) of the hydraulic pump 6A or 6B is reduced as a delivery pressure of the first or second hydraulic pump 6A or 6B becomes higher and an absorption torque of the hydraulic pump is prevented from exceeding a preset maximum torque.

It is noted that power supplied to the hydraulic swing motor 16 can be regulated by controlling the delivery flow rate of the second hydraulic pump 6B by the regulator 6Bx.

A rotary shaft of the motor generator 8 extends axially from a center of a body to both end sides, one end side of the rotary shaft is coupled to a rotary shaft of the engine 7, and the other end side of the rotary shaft is coupled to a rotary shaft of the first and second hydraulic pumps 6A and 6B. The motor generator 8 includes a function (regenerative function) as a generator converting power of the engine 7 into electric energy (electric power) and outputting the electric energy to the inverter (PCU) 12, and a function (powering function) as an electric motor driven by the electric energy (electric power) supplied from the inverter (PCU) 12 and assist-driving the first and second hydraulic pumps 6A and 6B.

The inverter (PCU) 12 converts alternating-current electric power generated by the motor generator 8 into direct-current electric power and outputs the direct-current electric power to the storage device 9 and the like when the motor generator 8 functions as the generator, and converts direct-current electric power from the storage device 9 into alternating-current electric power and supplies the alternating-current electric power to the motor generator 8 when the motor generator 8 functions as the electric motor. Furthermore, the inverter (PCU) 12 transmits information such as a revolution speed and a torque of the motor generator 8 and a temperature of the motor generator 8 to the controller 15 as a motor generator state.

The inverter (PCU) 13 for the electric swing motor 10 converts either the direct-current electric power generated by the motor generator 8 and output by the inverter (PCU) 12 or the direct-current electric power supplied from the storage device 9 into alternating-current electric power and supplies the alternating-current electric power to the electric swing motor 10. Furthermore, the inverter (PCU) 13 converts the alternating-current regenerated by the electric swing motor 10 that functions as a generator during swing braking into direct-current electric power and outputs the direct-current electric power to the storage device 9 and the like. The generated electric power is used by the motor generator 8 or used to charge the electric storage device 9 with the electric power. Moreover, the inverter (PCU) 13 transmits information such as a revolution speed and a torque of the electric swing motor 10 and a temperature of the electric swing motor 10 to the controller 15 as an electric swing motor state.

The storage device 9 supplies (discharges) the electric power to the inverters (PCU) 12 and 13 or stores (is charged with) the electric power generated by the motor generator 8 or the electric power from the electric swing motor 10. As the storage device 9, a lithium-ion battery or a capacitor, for example, is used.

The battery control unit (BCU) 14 detects a voltage or a current of the storage device 9, estimates an amount of the stored electric energy or so-called a remaining amount of the stored electric power, and transmits a signal of the amount to the controller 15. The battery control unit (BCU) 14 also transmits information such as a cell temperature of the storage device 9 to the controller 15 as a storage device state.

A target revolution speed signal from the controller 15 and an actual revolution speed signal of the engine 7 detected by a revolution speed sensor that is not shown are input to the engine control unit (ECU) 11. The engine control unit (ECU) 11 computes a revolution speed deviation, computes a target fuel injection amount on the basis of this revolution speed deviation, and outputs a corresponding control signal to an electronic governor provided in the engine 7. The electronic governor that is not shown is operated by the control signal, and injects a fuel corresponding to the target fuel injection amount to supply the fuel to the engine 7. Furthermore, the engine control unit (ECU) 11 transmits maximum output power of the engine 7 and the like varying with the engine revolution speed and the engine torque as well as an outside air temperature, an atmospheric pressure (a change in the atmospheric pressure depending on an altitude and a supercharging pressure by a turbocharger), and the like, to the controller 15 as an engine state. A value set by an operator in response to a content of work is set as a target revolution speed of the engine 7 using an engine control dial that is provided in a cab seat and not shown.

The boom cylinder 3a is provided with a cylinder stroke sensor 17 that detects a boom stroke amount and a boom speed. A signal detected by the cylinder stroke sensor 17 is input to the controller 15 as a front implement speed signal. Alternatively, a boom angle sensor may be attached to the boom cylinder 3a as an alternative to the cylinder stroke sensor 17 and a scheme for geometrically calculating the boom stoke amount and the boom speed from a detected boom angle may be adopted.

The hydraulic swing motor 16 or the electric swing motor 10 is provided with a swing angle sensor 18 that detects a swing angle and a swing angular speed. A signal detected by the swing angle sensor 18 is input to the controller 15 as a swing speed signal. If information about the swing angle and swing angular speed can be received from the inverter (PCU) 13, it is unnecessary to install the swing angle sensor 18.

The bucket cylinder 3c is provided with a cylinder pressure sensor 19 that detects a pressure of a rod-side hydraulic chamber. A signal detected by the cylinder pressure sensor 19 is input to the controller 15 as a load signal that represents a machine body state such as a bucket loaded state or a bucket unloaded state.

The controller 15 includes a control arithmetic circuit, and contents of control executed by this control arithmetic circuit will be described with reference to FIG. 3. As shown in FIG. 3, the controller 15 includes a target path computation section A1, a suppliable power computation section A2, an electric swing motor suppliable power computation section A3, and an actuator power computation section A4.

A front implement operation signal and a swing operation signal generated in response to the operation amount of the operation lever unit 4, the front implement speed signal detected by the cylinder stroke sensor 17, the swing speed signal detected by the swing angle sensor 18, and the load signal detected by the cylinder pressure sensor 19 are input to the target path computation section A1. As will be described later in detail, the target path computation section A1 computes a signal of a target trajectory that is a trajectory of a claw tip position of the front implement 1A from these signals, and outputs the signal of the target trajectory to the actuator power computation section A4.

Signals of the engine revolution speed, the engine torque, and the engine state from the engine control unit (ECU) 11; signals of the revolution speed, the torque, and the motor generator state of the motor generator 8 from the inverter (PCU) 12; and signals of the remaining amount of the stored electric power and the storage device state from the battery control unit (BCU) 14 are input to the suppliable power computation section A2. As will be described later, from these signals the suppliable power computation section A2 computes a signal of second suppliable power that can be supplied to the first and second hydraulic pumps 6A and 6B. The suppliable power computation section A2 outputs this second suppliable power signal to the actuator power computation section A4, a signal of first suppliable power only from the engine 7 to the electric swing motor suppliable power computation section A3 and the actuator power computation section A4.

Signals of the remaining amount of the stored electric power and the storage device state from the battery control unit (BCU) 14; signals of the revolution speed, the torque, and the electric swing motor state of the electric swing motor 10 from the inverter (PCU) 13; and the signal of the suppliable power from the suppliable power computation section A2 are input to the electric swing motor suppliable power computation section A3. As will described later in detail, from these signals the electric swing motor suppliable power computation section A3 computes a signal of swing electric motor suppliable power that can be supplied to the swing electric motor 10, and outputs the signal of the swing electric motor suppliable power to the actuator power computation section A4.

The front implement speed signal detected by the cylinder stroke sensor 17, the swing speed signal detected by the swing angle sensor 18, the signal of the target path computed by the target path computation section A1, the signal of the first suppliable power and the signal of the second suppliable power computed by the suppliable power computation section A2, and the signal of the swing electric motor suppliable power computed by the electric swing motor suppliable power computation section A3 are input to the actuator power computation section A4. As will be described later in detail, the actuator power computation section A4 computes a front implement target power signal, a hydraulic swing target power signal, and an electric swing target power signal from these signals, and controls power related to each of the engine 7, the motor generator 8, the first hydraulic pump 6A, the second hydraulic pump 6B, and the electric swing motor 10. Specifically, the engine 7 outputs a control signal to the engine control unit (ECU) 11, and the motor generator 8 outputs a control signal to the inverter (PCU) 12. Furthermore, the electric swing motor 10 outputs a control signal to the inverter (PCU) 13, and the first hydraulic pump 6A and the second hydraulic pump 6B output control signals to the regulators 6Ax and 6Bx.

Figure 4:
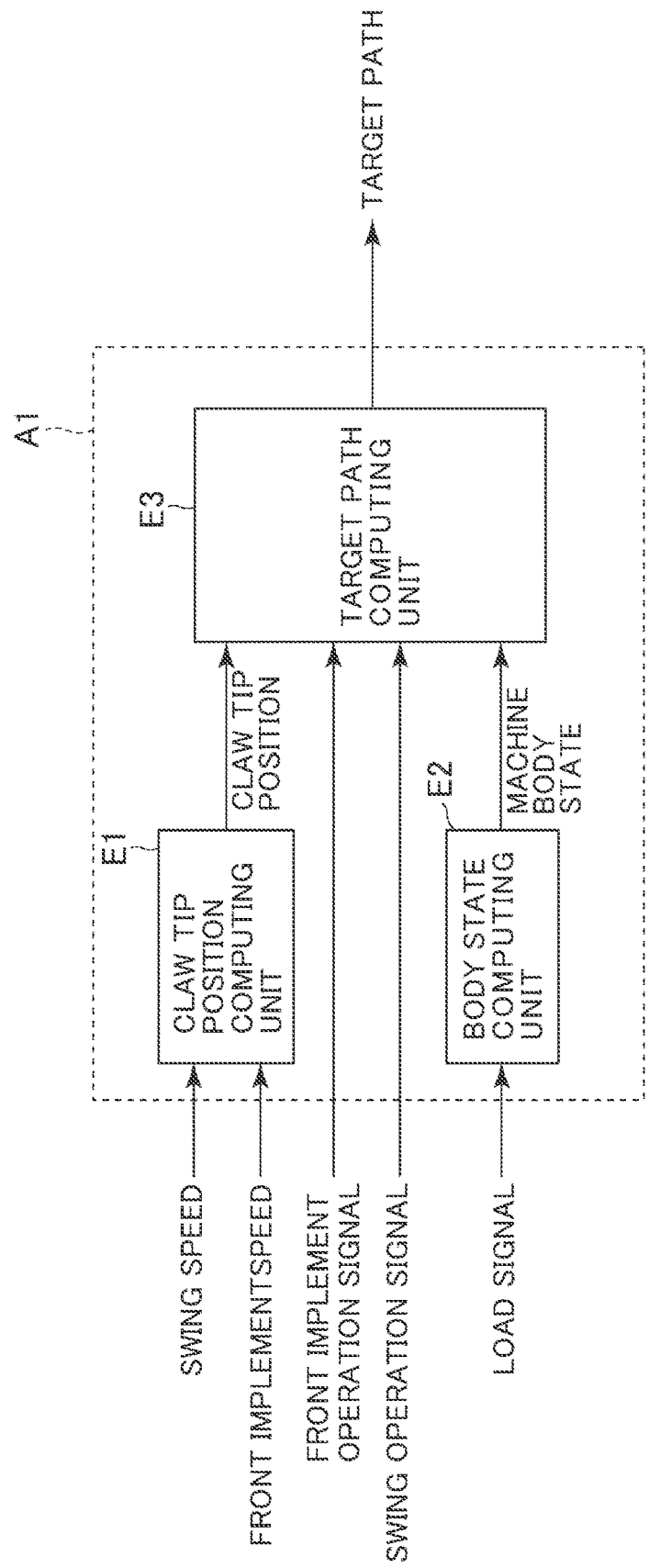
FIG. 4 is a control block diagram of a target path computation section that constitutes the embodiment of the control system for the construction machine according to the present invention.
Figure 5:
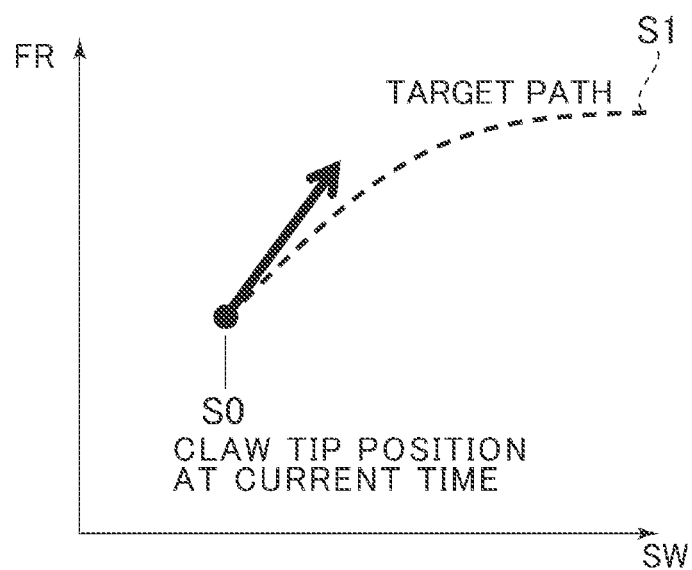
FIG. 5 is a conceptual diagram for describing a target path to be computed by the target path computation section that constitutes the embodiment of the control system for the construction machine according to the present invention.
Figure 6:
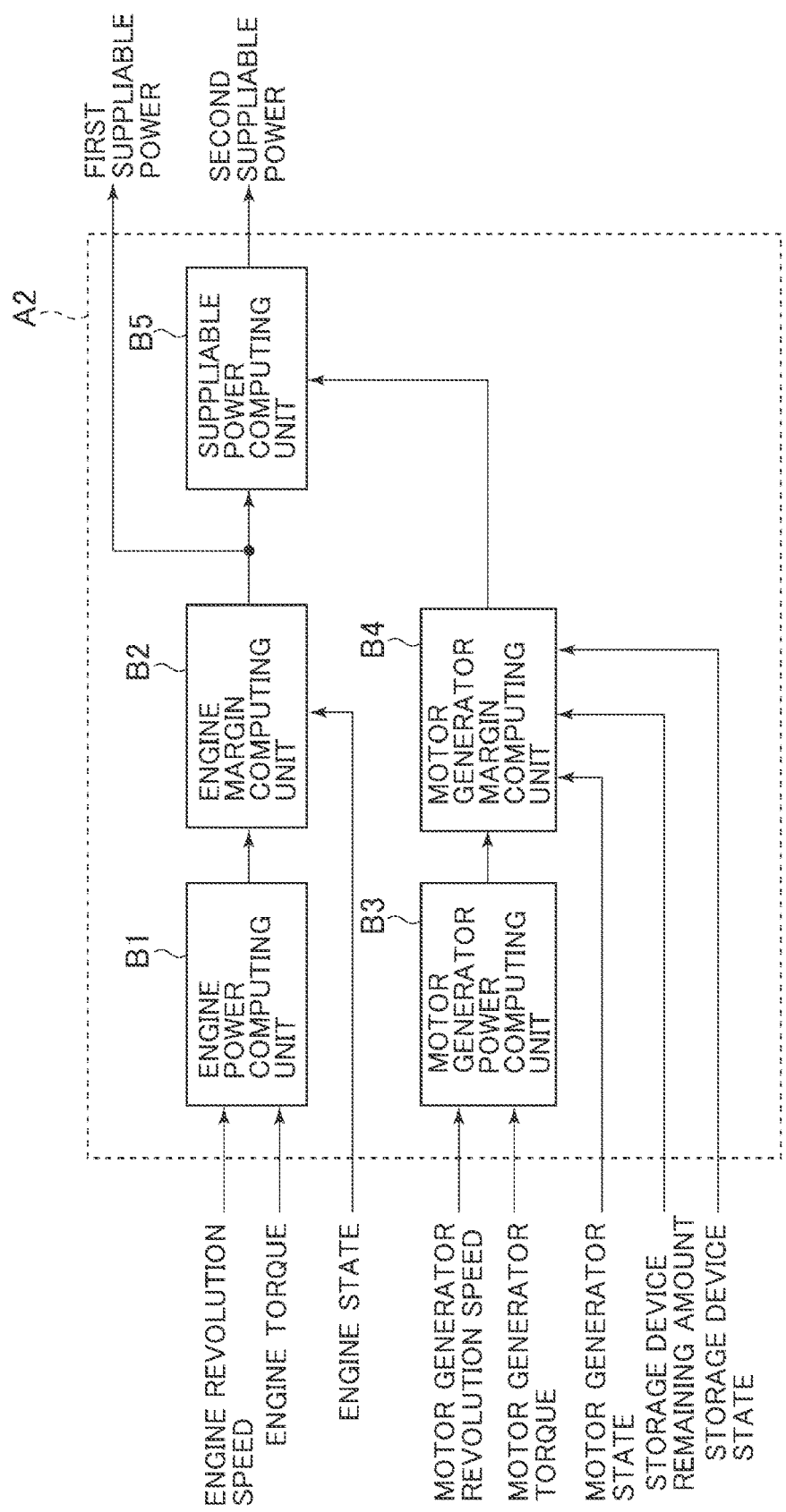
FIG. 6 is a control block diagram of a suppliable power computation section that constitutes the embodiment of the control system for the construction machine according to the present invention.
Figure 7:
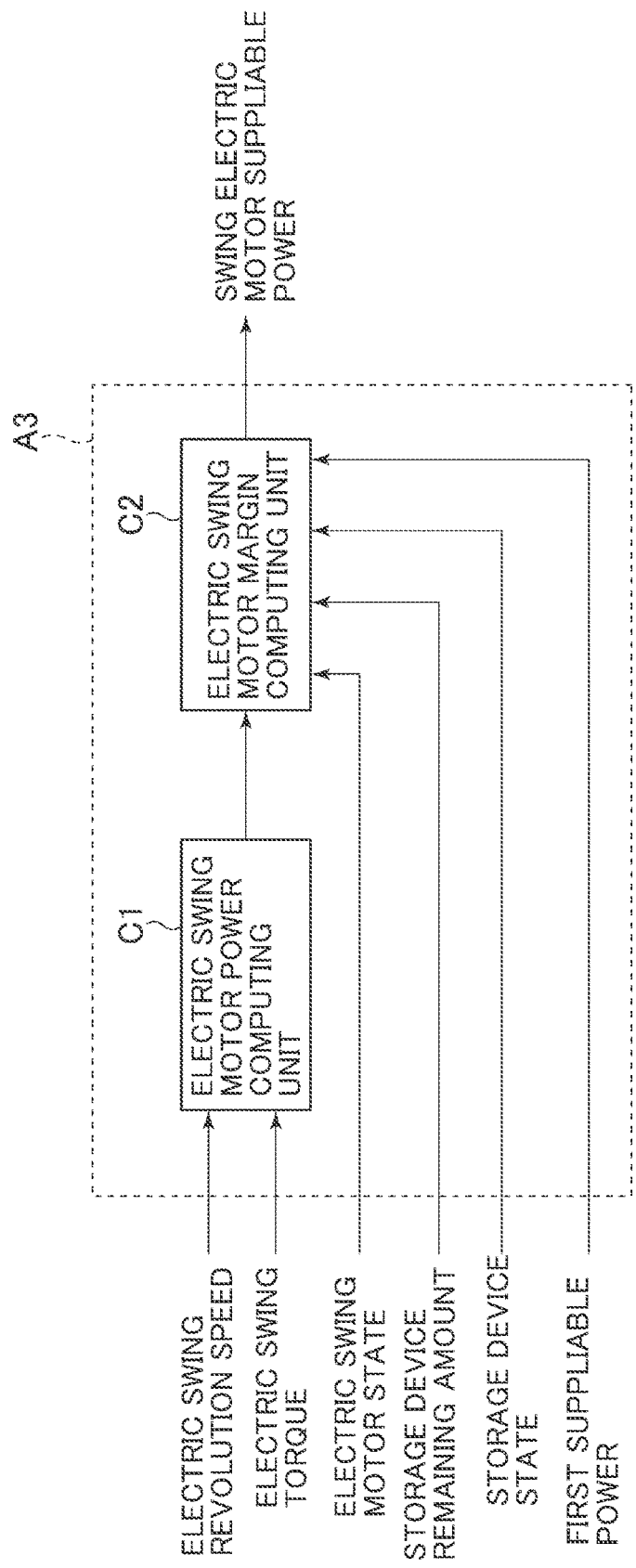
FIG. 7 is a control block diagram of an electric swing motor suppliable power computation section that constitutes the embodiment of the control system for the construction machine according to the present invention.
Figure 8:
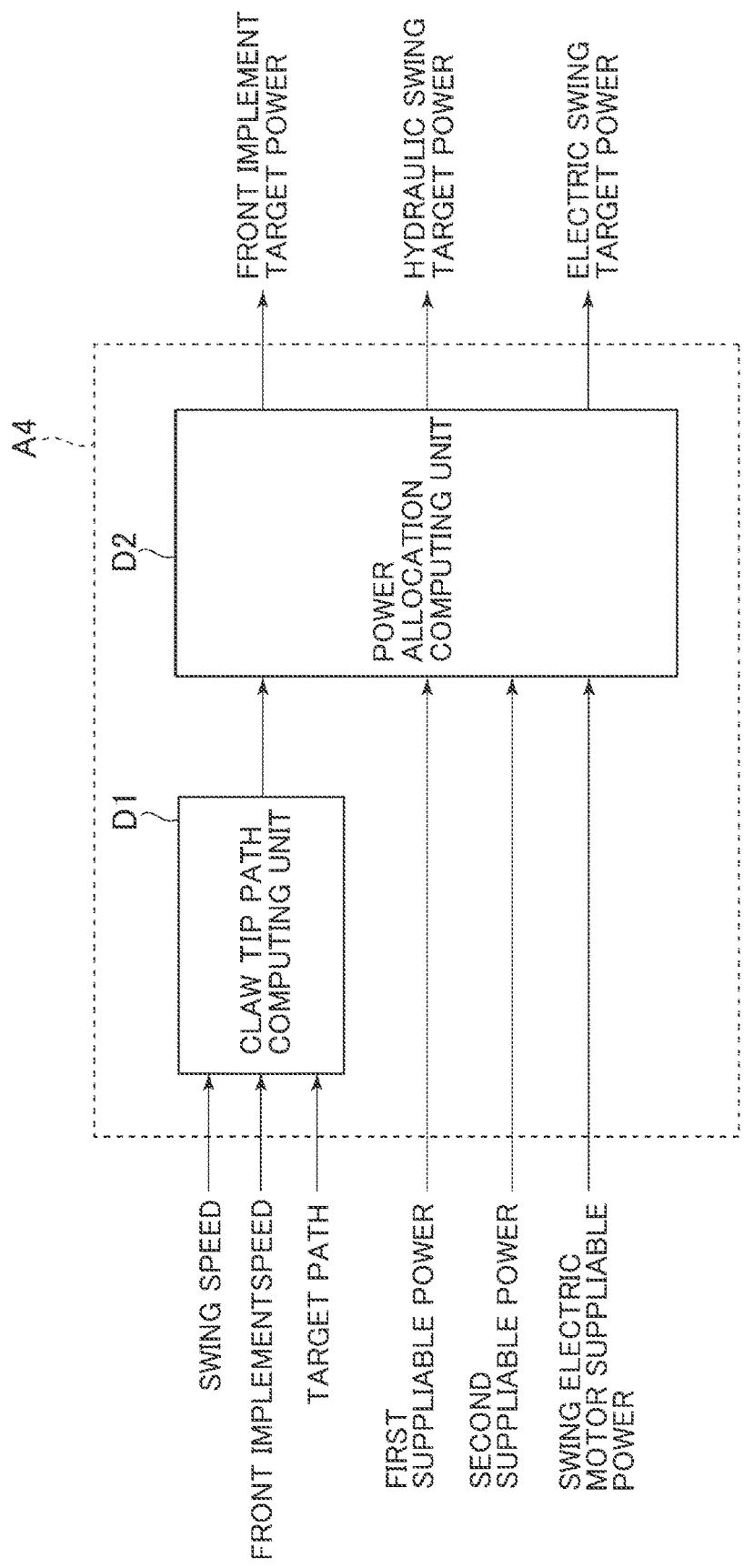
FIG. 8 is a control block diagram of an actuator power computation section that constitutes the embodiment of the control system for the construction machine according to the present invention.
Figure 9:
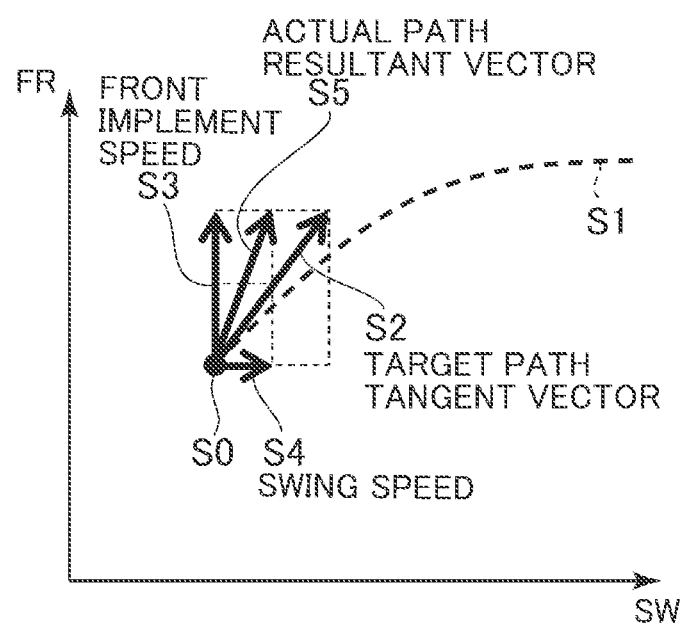
FIG. 9 is a conceptual diagram for describing computation by a claw tip path comparing unit in the actuator power computation section that constitutes the embodiment of the control system for the construction machine according to the present invention.
Figure 10A:
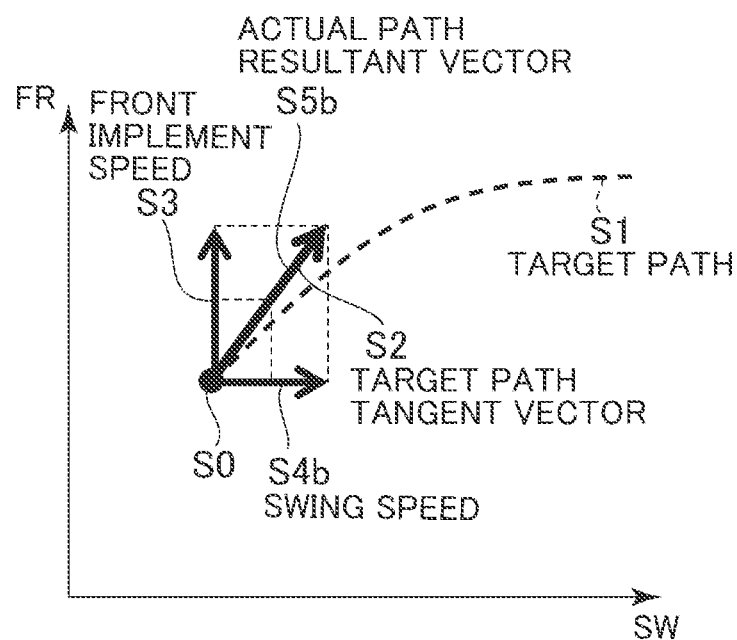
FIG. 10A is a conceptual diagram for describing an example of computation by a power allocation computing unit in the actuator power computation section that constitutes the embodiment of the control system for the construction machine according to the present invention.
Figure 10B:
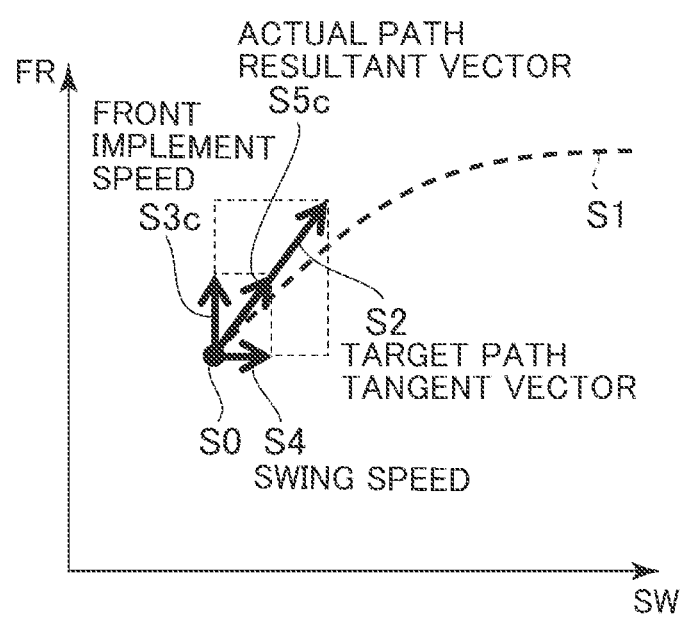
FIG. 10B is a conceptual diagram for describing another example of the computation by the power allocation computing unit in the actuator power computation section that constitutes the embodiment of the control system for the construction machine according to the present invention.

Each computation section will next be described in detail with reference to FIGS. 4 to 10B. FIG. 4 is a control block diagram of the target path computation section that constitutes the embodiment of the control system for the construction machine according to the present invention, FIG. 5 is a conceptual diagram for describing the target path to be computed by the target path computation section that constitutes the embodiment of the control system for the construction machine according to the present invention, and FIG. 6 is a control block diagram of the suppliable power computation section that constitutes the embodiment of the control system for the construction machine according to the present invention. FIG. 7 is a control block diagram of the electric swing motor suppliable power computation section that constitutes the embodiment of the control system for the construction machine according to the present invention, FIG. 8 is a control block diagram of the actuator power computation section that constitutes the embodiment of the control system for the construction machine according to the present invention, and FIG. 9 is a conceptual diagram for describing computation by a claw tip path comparing unit in the actuator power computation section that constitutes the embodiment of the control system for the construction machine according to the present invention. FIG. 10A is a conceptual diagram for describing an example of computation by a power allocation computing unit in the actuator power computation section that constitutes the embodiment of the control system for the construction machine according to the present invention, and FIG. 10B is a conceptual diagram for describing another example of the computation by the power allocation computing unit in the actuator power computation section that constitutes the embodiment of the control system for the construction machine according to the present invention.

As shown in FIG. 4, the target path computation section A1 includes a claw tip position computing unit E1, a machine body state computing unit E2, and a target path computing unit E3.

The swing speed signal and the front implement speed signal are input to the claw tip position computing unit E1, and the claw tip position computing unit E1 computes the claw tip position that is a tip end of the bucket 1c of the front implement 1A. Examples of a method for this computation include a method that includes integrating the input speeds, calculating the swing angle and a front implement position, and then calculating the claw tip position from a geometrical relationship. Needless to say, position information (such as the swing angle and the stroke amount) may be directly used as an alternative to the speeds. The claw tip position computing unit E1 outputs a signal of the calculated claw tip position to the target path computing unit E3.

The signal from the cylinder pressure sensor 19 provided at the bucket cylinder 3c is input to the machine body state computing unit E2 as the load signal, and the machine body state computing unit E2 computes the body state such as the loaded state of the bucket 1c or the unloaded state of the bucket 1c. The machine body state computing unit E2 outputs a signal of the calculated machine body state to the target path computing unit E3.

The signal of the claw tip position calculated by the claw tip position computing unit E1, the signal of the machine body state calculated by the machine body state computing unit E2, the front implement operation signal, and the swing operation signal are input to the target path computing unit E3. The target path computing unit E3 computes the target path of the claw tip of the front implement 1A on the basis of these signals. Here, if the operation lever unit 4 is a hydraulic lever, the front implement operation signal and the swing operation signal correspond to signals obtained by converting the pilot pressures into electric power. If the operation lever unit 4 is an electronic lever type, electric signals for respective operations may be used as they are.

Computation of the target path by the target path computing unit E3 will be described with reference to FIG. 5. In FIG. 5, a horizontal axis (SW) indicates the swing angle and a vertical axis (FR) indicates a position of the front implement 1A. A point S0 indicates the claw tip position of the front implement 1A at current time. This point S0 is calculated by the claw tip position computing unit E1 shown in FIG. 4. S1 indicated by a broken line indicates a time series variation of the target path computed with the claw tip position S0 at the current time as a base point. Here, an inclination and the like of the target path are defined by the front implement operation signal and the swing operation signal input to the target path computing unit E3 shown in FIG. 4. For example, the target path computing unit E3 generates the target path in such a manner that the swing speed becomes slower (the inclination is increased) as a boom raising operation amount is larger even with a same swing lever operation amount in a swing/boom raising operation.

Furthermore, the inclination and the like of the target path are corrected by the machine body state signal input from the machine body state computing unit E2 shown in FIG. 4. In this case, the target path computing unit E3 determines whether the bucket 1c is unloaded, loaded with earth and sand or the like from a result of the machine body state computing unit E2, and generates the target path in such a manner that the boom target speed is increased (the inclination is increased) when the bucket 1c is unloaded from that when the bucket 1c is loaded.

It is noted that the computation of the target path by the target path computing unit E3 can be arbitrarily stopped by an operator's intention. When the computation is stopped, computation by the actuator power computation section A4 to be described later is disabled.

Next, the suppliable power computation section A2 will be described with reference to FIG. 6. The suppliable power computation section A2 computes power that can be supplied to the first hydraulic pump 6A and the second hydraulic pump 6B on the basis of current statuses of the engine 7, the motor generator 8, and the storage device 9. The suppliable power computation section A2 includes an engine power computing unit B1, an engine margin computing unit B2, a motor generator power computing unit B3, a motor generator margin computing unit B4, and a suppliable power computing unit B5.

Signals of the engine revolution speed and the engine torque are input to the engine power computing unit B1, and the engine power computing unit B1 computes power currently output by the engine 7. The engine power computing unit B1 outputs a signal of the calculated and currently output power to the engine margin computing unit B2.

The currently output engine power calculated by the engine power computing unit B1 and an engine state signal are input to the engine margin computing unit B2. The engine margin computing unit B2 compares engine maximum output power in response to the engine state with the currently output engine power, computes a margin for the power suppliable from the engine 7, and outputs the margin for the power to the suppliable power computing unit B5 and the electric swing motor suppliable power computation section A3. It is defined that the output of the engine margin computing unit B2 is first suppliable power.

It is noted that the engine state signal includes a signal for determining an overheated state, a low supercharging pressure state or the like determined from a temperature of coolant of the engine 7. If such an engine state signal is input, the maximum output power of the engine 7 becomes a low value, compared with output power characteristics at normal time.

A motor generator revolution speed signal and a motor generator torque signal are input to the motor generator power computing unit B3, and the motor generator power computing unit B3 computes power currently output by the motor generator 8. The motor generator power computing unit B3 outputs a signal of the calculated and currently output power to the motor generator margin computing unit B4.

The currently output motor generator power calculated by the motor generator power computing unit B3, a motor generator state signal, a storage device remaining amount signal, and a storage device state signal are input to the motor generator margin computing unit B4. The motor generator margin computing unit B4 compares maximum output power of the motor generator 8 in response to the motor generator state with electric power supplied to the motor generator 8 limited in response to the currently output power of the motor generator 8, the storage device remaining amount, and the storage device state, computes a margin for the power suppliable from the motor generator 8, and outputs the margin for the power to the suppliable power computing unit B5.

Similarly to the engine state signal described above, the motor generator state signal and the storage device state signal each include, for example, an overheated state signal. If such a state signal is input, the maximum output power of the motor generator 8 and that of the storage device 9 become low values, compared with output power characteristics at normal time. Furthermore, the state signal for the storage device 9 includes a state of health of the capacitor or a so-called SOH (State Of Health). When the SOH is low, the maximum output power of the storage device 9 becomes lower than that when the SOH is high.

The first suppliable power calculated by the engine margin computing unit B2 and the margin for the power that is calculated by the motor generator margin computing unit B4 and is suppliable from the motor generator 8 are input to the suppliable power computing unit B5. The suppliable power computing unit B5 computes power that can be supplied by the engine 7 and the motor generator 8 that act as a power train. It is defined that an output of the suppliable power computing unit B5 is the second suppliable power. It is noted that in a case of a hybrid excavator of a type that does not include the motor generator 8 and the inverter (PCU) 12 or a hydraulic excavator, the output of the engine margin computing unit B2 serves as the output of the suppliable power computing unit A2 as it is.

Next, the electric swing motor suppliable power computation section A3 will be described with reference to FIG. 7. The electric swing motor suppliable power computation section A3 computes a signal of swing electric motor suppliable power that can be supplied to the swing electric motor 10, and includes an electric swing motor power computing unit C1 and an electric swing motor margin computing unit C2.

An electric swing revolution speed signal and an electric swing torque signal are input to the electric swing motor power computing unit C1, and the electric swing motor power computing unit C1 computes power currently output by the electric swing motor 10 from these signals. The electric swing motor power computing unit C1 outputs a signal of the calculated and currently output power to the electric swing motor margin computing unit C2.

The currently output electric swing motor power calculated by the electric swing motor power computing unit C1, an electric swing motor state signal, the storage device remaining amount signal, the storage device state signal, and the suppliable power (first suppliable power) calculated by the suppliable power computation section A2 are input to the electric swing motor margin computing unit C2. The electric swing motor margin computing unit C2 compares the electric power supplied to the electric swing motor 10 limited in response to maximum output power of the electric swing motor 10 in response to an electric swing motor state, the currently output power of the electric swing motor 10, the storage device remaining amount, and the storage device state with the "first suppliable power" calculated by the suppliable power computation section A2, and computes power suppliable from the electric swing motor 10.

Similarly to the motor generator state signal described above, the electric swing motor state signal includes, for example, an overheated state signal. If such a state signal is input, the maximum output power of the electric swing motor 10 becomes a low value, compared with output power characteristics at normal time.

A reason for using the first suppliable power to compute the output power of the electric swing motor 10 is to consider a case in which the motor generator 8 is made to perform power generation operation by excessive power of the engine 7 and the electric swing motor 10 is driven by the generated electric power. It is noted that in a case of a hybrid excavator of the type that does not include the electric swing motor 10 and the inverter (PCU) 13 or the hydraulic excavator, the electric swing motor suppliable power computation section A3 does not operate.

Next, the actuator power computation section A4 will be described with reference to FIG. 8. The actuator power computation section A4 computes the front implement target power signal, the hydraulic swing target power signal, and the electric swing target power signal, and includes a claw tip path comparing unit D1 and a power allocation computing unit D2.

The swing speed signal, the front implement speed signal, and the signal of the target path calculated by the target path computing unit A1 are input to the claw tip path comparing unit D1. The claw tip path comparing unit D1 compares speed vectors calculated from the signal of the target path with the actual swing speed signal and the actual front implement speed signal, determines whether the swing speed and a front implement speed precede or are delayed behind the speed vectors calculated from the target path, and determines a relative precedence/delay relationship between the front implement speed and the swing speed. The claw tip path comparing unit D1 outputs signals of these determinations to the power allocation computing unit D2.

Computation by the claw tip path comparing unit D1 will be described with reference to FIG. 9. In FIG. 9, a horizontal axis (SW) indicates the swing angle and a vertical axis (FR) indicates the position of the front implement 1A. The point S0 indicates the claw tip position of the front implement 1A at current time, and S1 indicated by the broken line indicates the time series variation of the target path computed with the claw tip position S0 at the current time as the base point. Further, each arrow indicates a vector and a length of each arrow represents the swing speed or the front implement speed. S2 is a tangent vector of the target path S1 at the point S0 and indicates the speed vector calculated from the target path. S4 indicates the speed vector of the swing speed signal, and S3 indicates the speed vector of the front implement speed signal. S5 indicates a resultant vector of an actual path.

It is understood from FIG. 9 that the swing speed (S4) is delayed behind the speed vector S2 calculated from the target path, and that the swing speed (S4) is delayed behind the front implement speed (S3).

Referring back to FIG. 8, a result of comparison of a claw tip path with the target path computed by the claw tip path comparing unit D1, the first suppliable power signal, the second suppliable power signal, and the signal of the swing electric motor suppliable power are input to the power allocation computing unit D2. The power allocation computing unit D2 allocates front implement target power, hydraulic swing target power, and electric swing target power in response to these signals. Specifically, a control signal is output to the regulator 6Ax of the first hydraulic pump 6A for controlling the hydraulic fluid supplied to the hydraulic actuators (for example, the boom cylinder 3a) of the front implement 1A as the front implement target power. If the front implement target power is to be increased, then control signals are output to the engine control unit (ECU) 11 and the inverter (PCU) 12 for simultaneously controlling the power of either the engine 7 or the motor generator 8 or both of the power so that hydraulic fluid power supplied from the first hydraulic pump 6A to the hydraulic actuators of the front implement 1A can be secured. A control signal is output to the regulator 6Bx of the second hydraulic pump 6B for controlling power of the hydraulic swing motor 16 as the hydraulic swing target power. If the hydraulic swing target power is to be increased, control signals are output to the engine control unit (ECU) 11 and the inverter (PCU) 12 for simultaneously controlling the power of either the engine 7 or the motor generator 8 or both of the power so that hydraulic fluid power supplied from the second hydraulic pump 6B to the hydraulic swing motor 16 can be secured. In addition, a control signal is output to the inverter (PCU) 13 for controlling the power of the electric swing motor 10 as the electric swing target power.

A basic principle for this allocation is to improve an actuator speed balance by increasing the target power of the delayed actuator in such a manner as to increase the speed of the delayed actuator when there is a margin for the suppliable power. For example, when the swing speed precedes the front implement speed, the speed balance between the swing speed and the front implement speed is regulated by increasing the front implement target power. On the other hand, the actuator speed balance is improved by suppressing the target power of the preceding actuator in such a manner as to reduce the speed of the preceding actuator when there is no margin for the suppliable power.

Computation by the power allocation computing unit D2 will be described with reference to FIGS. 10A and 10B. The vertical axis, the horizontal axis, and same characters are commonly shown in FIGS. 10A and 10B. FIG. 10A illustrates a case in which there is a margin for the suppliable power and the target power of the delayed actuator is increased in such a manner as to increase the speed of the delayed actuator speed. The vector of the swing speed is increased from S4 to S4b by raising the swing target power from the resultant vector of the actual path indicated by S5 of FIG. 9 (in which the swing speed (S4) is delayed behind the speed vector S2 calculated from the target path). By doing so, a direction of a resultant vector S5b of the actual path matches a direction of the tangent vector S2 of the target path. Since the claw tip position quickly moves along the target path in such an operation, it is possible to realize excellent work efficiency and excellent operability.

FIG. 10B illustrates a case in which there is no margin for the suppliable power and the target power of the preceding actuator is suppressed in such a manner as to reduce the speed of the preceding actuator speed. The vector of the front implement speed is reduced from S3 to S3c by suppressing the front implement target power from the resultant vector of the actual path indicated by S5 of FIG. 9 (in which the swing speed (S4) is delayed behind the speed vector S2 calculated from the target path). By doing so, a direction of a resultant vector S5c from the vector of the swing speed S4 and the vector of the front implement speed S3c matches the direction of the tangent vector S2 of the target path. As a result, the excellent operability is maintained. It is noted, however, that workability in FIG. 10B is inferior to that in FIG. 10A since magnitudes of the vectors are smaller.

Figure 13:
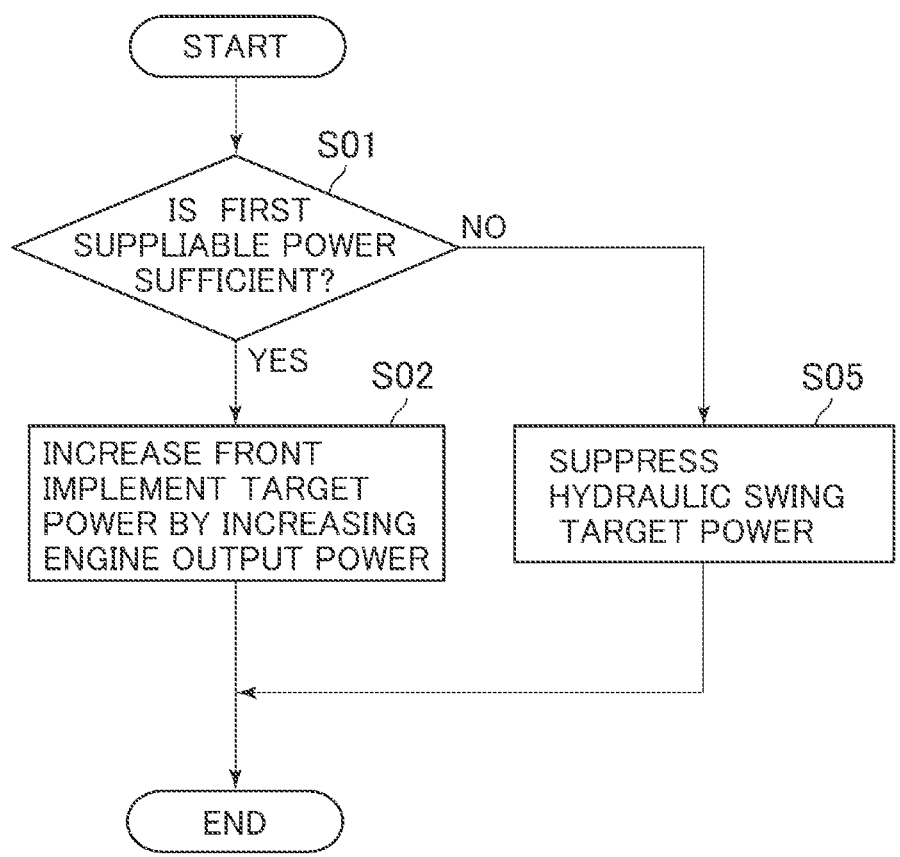
FIG. 13 is another example of the flowchart diagram illustrating the partial modification of the contents of the process by the actuator power computation section shown in FIG. 11 in response to the mode of the construction machine.

Next, a power allocation method implemented by the power allocation computing unit D2 of the actuator power computation section A4 will be described with reference to FIGS. 11 to 14. FIG. 11 is a flowchart diagram illustrating an example of contents of a process by the actuator power computation section that constitutes the embodiment of the control system for the construction machine according to the present invention, and FIG. 12 is an example of a flowchart diagram illustrating partial modification of the contents of the process by the actuator power computation section shown in FIG. 11 in response to a mode of the construction machine. FIG. 13 is another example of the flowchart diagram illustrating the partial modification of the contents of the process by the actuator power computation section shown in FIG. 11 in response to the mode of the construction machine, and FIG. 14 is a flowchart diagram illustrating another example of the contents of the process by the actuator power computation section that constitutes the embodiment of the control system for the construction machine according to the present invention.

FIG. 11 illustrates a control operation of the power allocation computing unit D2 when the power allocation computing unit D2 receives a result of comparison that the swing speed precedes the front implement speed from the claw tip path comparing unit D1.

The power allocation computing unit D2 determines whether the first suppliable power is sufficient (Step S01). Specifically, the power allocation computing unit D2 determines whether there is a margin for the power that can be supplied from the engine 7. When there is a margin for the first suppliable power, a process proceeds to (Step S02); otherwise, the process proceeds to (Step S03).

The power allocation computing unit D2 realizes an increase in the front implement target power by increasing the power of the engine 7 (Step S02). It is thereby possible to increase the front implement speed and maintain the balance between the front implement speed and the swing speed.

When it is determined in (Step S01) that there is no margin for the first suppliable power, the power allocation computing unit D2 determines whether the second suppliable power is sufficient (Step S03). Specifically, the power allocation computing unit D2 determines whether there is a margin for the power that can be supplied from the engine 7 and the motor generator 8. When there is a margin for the second suppliable power, the process proceeds to (Step S04); otherwise, the process proceeds to (Step S05).

The power allocation computing unit D2 realizes the increase in the front implement target power by increasing the power of the motor generator 8 (Step S04). This is because it is known in (Step S01) that there is no margin for the power of the engine 7.

When it is determined in (Step S05) that there is no margin for the second suppliable power (Step S03), the power allocation computing unit D2 suppresses the hydraulic swing target power. This is intended to maintain the speed balance by reducing the swing power since both the engine 7 and the motor generator 8 supply sufficient power and it is impossible to further increase the front implement speed. Since it is known that a hydraulic drive swing motor is inferior in efficiency to an electric drive swing motor, the hydraulic swing target power is preferentially suppressed. Specifically, a control signal is output to the regulator 6Bx of the second hydraulic pump 6B for controlling the power of the hydraulic swing motor 16.

The power allocation computing unit D2 determines whether the swing speed is preceding the front implement speed (Step S06). Specifically, the power allocation computing unit D2 makes a determination on the basis of the result of the comparison from the claw tip path comparing unit D1. When the swing speed still precedes after the power allocation computing unit D2 reduces the hydraulic swing target power in (Step S05), the process proceeds to (Step S07); otherwise, the process is ended.

The power allocation computing unit D2 suppresses the electric swing target power (Step S07). Specifically, a control signal is output to the inverter (PCU) 13 for suppressing the power of the electric swing motor 10. It is possible to maintain the balance between the swing speed and the front implement speed by suppressing the electric swing target power.

A flow of one example of the contents of the process by the actuator power computation section described above is based on the premise of the configuration of the actuator drive control system for the hybrid excavator shown in FIG. 2. However, desired control can be realized for the hybrid excavator excluding a part of the constituent units or the hydraulic excavator by dispensing with the process for the corresponding units from the flowchart of FIG. 11.

For example, in a case of the hybrid excavator of a fully electric swing motor type that does not include the hydraulic swing motor 16 according to the present embodiment, the process is according to a flowchart of FIG. 12. The flowchart of FIG. 12 is obtained by eliminating (Step S05) and (Step S06) from the abovementioned flow. When it is determined in (Step S03) that there is no margin for the second suppliable power, the process promptly proceeds to (Step S07), in which the power allocation computing unit D2 suppresses the electric swing target power.

Furthermore, in a case of an ordinary hydraulic excavator that does not include the motor generator 8, the storage device 9, the electric swing motor 10, the inverter (PCU) 12, the inverter (PCU) 13, and the battery control unit (BCU) 14 according to the present embodiment, the process is according to a flowchart of FIG. 13. The flowchart of FIG. 13 is obtained by eliminating (Step S03), (Step S04), (Step S06), and (Step S07) from the abovementioned flow. When it is determined in (Step S01) that there is no margin for the first suppliable power, the process promptly proceeds to (Step S05), in which the power allocation computing unit D2 exercises simple control in such a manner as to suppress the hydraulic swing target power.

A control operation of the power allocation computing unit D2 when the power allocation computing unit D2 receives a result of comparison that the front implement speed precedes the swing speed will be described with reference to FIG. 14.

The power allocation computing unit D2 determines whether the swing electric motor suppliable power is sufficient (Step S11). Specifically, the power allocation computing unit D2 determines whether there is a margin for the swing electric motor suppliable power. When there is a margin for the swing electric motor suppliable power, a process proceeds to (Step S12); otherwise, the process proceeds to (Step S13).

The power allocation computing unit D2 increases the electric swing target power by supply from the storage device 9 (Step S12). Specifically, a direction of the tangent vector of the target path matches a direction of the resultant vector of the actual path by the increase in the swing speed vector as shown in FIG. 10A. It is thereby possible to increase the swing speed and maintain the balance between the swing speed and the front implement speed.

When it is determined in (Step S11) that there is no margin for the swing electric motor suppliable power, the power allocation computing unit D2 determines whether the second suppliable power is sufficient (Step S13). Specifically, the power allocation computing unit D2 determines whether there is a margin for the power that can be supplied from the engine 7 and the motor generator 8. When there is a margin for the second suppliable power, the process proceeds to (Step S15); otherwise, the process proceeds to (Step S14).

When it is determined in (Step S13) that there is no margin for the second suppliable power, the power allocation computing unit D2 suppresses the front implement target power (Step S14). Since there is no margin for both the engine 7 and the storage device 9 and it is impossible to increase the swing speed, suppressing the front implement target power to reduce the front implement speed makes it possible to maintain the balance between the front implement speed and the swing speed. Specifically, the direction of the resultant vector of the actual path is made to match the direction of the tangent vector of the target path by reducing the front implement speed vector as shown in FIG. 10B. It is thereby possible to maintain the balance between the front implement speed and the swing speed.

When it is determined in (Step S13) that there is a margin for the second suppliable power, the power allocation computing unit D2 determines whether the first suppliable power is sufficient (Step S15). When there is a margin for the first suppliable power, a process proceeds to (Step S16); otherwise, the process proceeds to (Step S17).

The power allocation computing unit D2 increases the electric swing target power by generated electric power (Step S16). In this case, since there is no margin for the storage device 9 but there is a margin for the engine 7, then the motor generator 8 is made to perform power generation operation by the engine 7, and the generated electric power is supplied to the electric swing motor 10 to increase the electric swing target power. The swing speed is increased and the balance between the swing speed and the front implement speed is improved.

When it is determined in (Step S15) that there is no margin for the first suppliable power, the power allocation computing unit D2 increases the hydraulic swing target power (Step S17). In this case, since there is no margin for the engine 7 but there is a margin for the storage device 9, the motor generator 8 is driven, thereby realizing the increase in the hydraulic swing target power by the regulator 6Bx of the second hydraulic pump 6B. The swing speed is increased and the balance between the swing speed and the front implement speed is improved.

When there is a margin for the output power of the storage device 9, the process proceeds to (Step S12) upon a determination (Step S11) at normal time and the power allocation computing unit D2 executes the "increase in the electric swing target power." However, in a case of a situation in which the electric swing motor 10 is in an overheated state, a state in which the "there is a margin for the output power of the storage device 9 but there is no margin for the swing electric motor suppliable power" occurs and the power allocation computing unit D2 executes (Step S17).

Similarly to a case of describing the control operation of the power allocation computing unit D2 when the swing speed precedes the front implement speed, a flow of another example of the contents of the process by the actuator power computation section shown in FIG. 14 is based on the premise of the configuration of the actuator drive control system for the hybrid excavator shown in FIG. 2. However, desired control can be realized for the hybrid excavator that does not include a part of the constituent units or the hydraulic excavator by dispensing with the process for the corresponding units from the flowchart of FIG. 14.

According to the embodiment of the control system for the construction machine of the present invention, it is easy to keep the trajectory of the front implement 1A at the target position at the time of the combined operation and it is, therefore, possible to maintain excellent operability for the swing-combined operation even if the power suppliable from the engine 7 or the electric power suppliable from the storage device 9 varies.

Furthermore, according to the embodiment of the control system for the construction machine of the present invention, when sufficient suppliable power exists, the units are controlled at the speeds along the target path at the time of the combined operation and it is, therefore, possible to achieve the operation that can ensure that the operator does not feel discomfort and, at the same time, ensures high workability.

Furthermore, the present invention is not limited to the embodiment described above but encompasses various modifications. The abovementioned embodiment has been described in detail for describing the present invention so that the present invention is easy to understand. The present invention is not always limited to the embodiment having all the configurations.

DESCRIPTION OF REFERENCE CHARACTERS

1A: Front implement
1B: Machine body
1a: Boom
1b: Arm
1c: Bucket
1d: Upper swing structure
1e: Lower travel structure
3a: Boom cylinder
3b: Arm cylinder
3c: Bucket cylinder
4: Operation lever unit
5: Control valve
6A: First hydraulic pump
6B: Second hydraulic pump
7: Engine
8: Motor generator
9: Storage device
10: Electric swing motor
11: Engine control unit (ECU)
12, 13: Inverter (PCU)
14: Battery control unit (BCU)
15: Controller
16: Hydraulic swing motor
17: Cylinder stroke sensor
18: Swing angle sensor
19: Cylinder pressure sensor

The invention claimed is:
1. A construction machine, comprising:
an engine; a hydraulic pump driven by the engine; a front implement driven by a hydraulic actuator and including a boom, an arm and a bucket; a swing structure driven by a swing motor; a front implement operation device for operating the front implement; and a swing operation device for operating the swing structure, wherein the construction machine further comprises:

a front implement speed detector that detects a speed of the front implement and comprises a cylinder stroke sensor or a boom angle sensor;

a swing structure speed detector that detects an angular speed of the swing structure and comprises a swing angle sensor or an inverter; and a controller configured to:
receive an operation amount of the front implement operation device, an operation amount of the swing operation device, the speed of the front implement detected by the front implement speed detector, and the angular speed of the swing structure detected by the swing structure speed detector, compute a target path of a claw tip position of the bucket, and regulate power supplied to the hydraulic actuator that drives the front implement or the swing structure in such a manner that a claw tip of the bucket follows the target path computed when the front implement operation device and the swing operation device are operated simultaneously, wherein the controller is further configured to:
compare power actually output by the engine with power capable of being outputted by the engine thereby calculating first suppliable power, and when the first suppliable power can be additionally supplied by the engine, compare a front implement speed that is the speed of the front implement with a swing speed that is the speed of the swing structure and increase the power supplied to the front implement or the swing structure having the speed delayed behind a speed of the claw tip of the bucket calculated from the target path, and when the first suppliable power cannot be additionally supplied by the engine, suppress the power supplied to the front implement or the swing structure having the speed preceding the speed the claw tip of the bucket calculated from the target path.

2. The construction machine according to claim 1, further comprising:

a motor generator that enables a torque to be transferred between the motor generator and the engine; and a storage device that transmits and receives electric power to and from the motor generator, wherein the controller is further configured to:
compare power actually output by the engine and the motor generator with power capable of being outputted by the engine and the motor generator thereby calculating second suppliable power, and when the second suppliable power can be additionally supplied by the engine and the motor generator, compare the front implement speed with the swing speed and increase the power supplied to the front implement or the swing structure having the speed delayed behind the speed of the target path, and when the second suppliable power cannot be additionally supplied by the engine and the motor generator, suppress the power supplied to the front implement or the swing structure having the speed preceding the speed of the target path.

3. The construction machine according to claim 2, wherein the swing motor makes a combined use of a hydraulic swing motor driven by a hydraulic fluid supplied from the hydraulic pump and an electric swing motor that transmits and receives the electric power to and from the storage device, and wherein the controller is further configured to:
compare power actually output by the electric swing motor with power that can be output by the electric swing motor and that is determined in response to a remaining amount of the electric power stored in the storage device thereby calculating electric swing motor suppliable power, and when the swing structure is accelerating:
(a) increase output power of the electric swing motor if the swing speed is delayed behind a target speed determined from the target path and there is a margin for the electric swing motor suppliable power, (b) increase output power of the hydraulic swing motor if the swing speed is delayed behind the target speed, there is no margin for the electric swing motor suppliable power, and there is a margin for the second suppliable power, (c) suppress output power of the front implement if the swing speed is delayed behind the target speed and there is no margin for both the electric swing motor suppliable power and the second suppliable power, (d) increase the output power of the front implement if the front implement speed is delayed behind the target speed and there is the margin for the second suppliable power, (e) suppress the output power of the hydraulic swing motor if the front implement speed is delayed behind the target speed and there is no margin for the second suppliable power, and (f) suppress the output power of the electric swing motor if the front implement speed is still delayed behind the target speed after suppressing the output power of the hydraulic swing motor by the (e).

4. The construction machine according to claim 2, wherein wherein the swing motor is an electric swing motor that transmits and receives the electric power to and from the storage device, and wherein the controller is further configured to:
compare power actually output by the electric swing motor with power that can be output by the electric swing motor and that is determined in response to a remaining amount of the electric power stored in the storage device thereby calculating electric swing motor suppliable power, and wherein when the swing structure is accelerating, the controller (a') increase output power of the electric swing motor if the swing speed is delayed behind a target speed determined from the target path and there is a margin for the electric swing motor suppliable power, (b') increase the output power of the electric swing motor by causing the motor generator to generate electric power if the swing speed is delayed behind the target speed, there is no margin for the electric swing motor suppliable power, and there is a margin for the first suppliable power, (c') suppress output power of the front implement if the swing speed is delayed behind the target speed and there is no margin for both the electric swing motor suppliable power and the second suppliable power, (d') increase the output power of the front implement if the front implement speed is delayed behind the target speed and there is a margin for the second suppliable power, and
(e') suppress the output power of the electric swing motor if the front implement speed is delayed behind the target speed and there is no margin for the second suppliable power.

* * * * *